(12) United States Patent      (10) Patent No.: US 12,665,674 B2
Kohli et al.                      (45) Date of Patent: Jun. 23, 2026

(54) OPTICAL COMMUNICATION SYSTEM

(71) Applicant: Cspeed Inc., Palo Alto, CA (US)

(72) Inventors: Sanjai Kohli, Los Altos Hills, CA (US); Stefanos Sidiropoulos, Palo Alto, CA (US)

(73) Assignee: Cspeed Inc., Palo Alto, CA (US)

( * ) Notice: Subject to any disclaimer, the term of this patent is extended or adjusted under 35 U.S.C. 154(b) by 239 days.

(21) Appl. No.: 18/754,705

(22) Filed: Jun. 26, 2024

(65)          Prior Publication Data

US 2025/0358012 A1     Nov. 20, 2025

Related U.S. Application Data

(60) Provisional application No. 63/648,413, filed on May 16, 2024.

(51) Int. Cl.
H04B 10/50          (2013.01)
(52) U.S. Cl.
CPC ................................. H04B 10/503 (2013.01)
(58) Field of Classification Search
CPC ........ H04B 10/07953; H04B 10/07955; H04B 10/0799; H04B 10/503; H04B 10/506; H04B 1/0003; H04B 1/0007; H04B 1/0028; H04B 1/0053; H04B 1/0064; H04B 1/0067; H04B 1/03; H04B 1/04; H04B 1/02; H04B 1/08; H04B 1/06; H04B 1/10; H04B 1/16; H04B 1/38; H04B 1/40; H04B 1/62; H04B 1/66; H04B 1/69; H04B 1/74;

(Continued)

(56)              References Cited

U.S. PATENT DOCUMENTS 5,623,355 A     4/1997  Olsen
6,325,553 B1   12/2001  Deacon et al.
                (Continued)

FOREIGN PATENT DOCUMENTS

EP          3487094 A1 *   5/2019  ......... H04Q 11/0005

OTHER PUBLICATIONS

Tiago M. F. Alves et al., "High Granularity Multiband OFDM Virtual Carrier-Assisted Direct-Detection Metro Networks," Dec. 16, 2014, Journal of Lightwave Technology, vol. 33, No. 1, Jan. 1, 2015, pp. 42-52.*

(Continued)

*Primary Examiner* — Omar S Ismail
(74) *Attorney, Agent, or Firm* — Brian R. Short

(57)              ABSTRACT

Apparatuses, methods, and systems for optical transmission are disclosed. One method includes generating, by each of a plurality of M different selectable lasers, an optical communication signal having a carrier frequency within a corresponding channel that is different than a carrier frequency and corresponding channel of each of other different lasers, selecting and mapping N of the M selectable lasers based on feedback regarding a quality the M different lasers, wherein N<M, selecting the N of the M selectable lasers for transmission over an optical fiber to a second optical receiver system, and receiving K input data streams, and generating N laser data streams, wherein each of the N laser data streams modulates a carrier signal of the selected N lasers, wherein a mapping of the K input data streams to the N laser data streams is modulated on each of the carrier signals of the selected N lasers.

19 Claims, 11 Drawing Sheets

(58) Field of Classification Search
CPC ... H04B 3/02; H04B 3/54; H04B 5/20; H04B
5/40; H04B 5/70; H04B 7/02; H04B
7/14; H04B 7/24; H04B 10/07; H04B
10/03; H04B 10/073; H04B 10/075;
H04B 10/077; H04B 10/079; H04B
10/0795; H04B 10/11; H04B 10/25;
H04B 10/27; H04B 10/29; H04B 10/40;
H04B 10/50; H04B 10/501; H04B
10/516; H04B 10/58; H04B 14/002;
H04B 14/02; H04B 15/02; H04B
17/0082; H04B 17/10; H04B 17/20;
H04B 17/30; H04B 17/40; H04B
2201/69; H04B 2203/54; H04B 2210/07;
H04B 2210/25; H04B 2215/061; H04B
2215/064; H04B 10/80; H04B 10/61;
H04B 10/66
See application file for complete search history.

(56) References Cited

U.S. PATENT DOCUMENTS

| | | | | |
|---|---|---|---|---|
| 6,882,765 | B1* | 4/2005 | Erickson | H04J 14/0293 |
| | | | | 398/20 |
| 7,782,734 | B2 | 8/2010 | Kim et al. | |
| 10,782,472 | B2 | 9/2020 | Pezeshki et al. | |
| 11,336,367 | B1* | 5/2022 | Oveis Gharan | H04B 10/075 |
| 11,855,694 | B1* | 12/2023 | Zhang | H04B 10/27 |
| 11,996,887 | B1* | 5/2024 | Chaffee | H04B 10/118 |
| 2002/0145787 | A1* | 10/2002 | Shpantzer | H04B 10/2572 |
| | | | | 398/99 |
| 2002/0186435 | A1* | 12/2002 | Shpantzer | H04B 10/2572 |
| | | | | 398/99 |
| 2004/0136534 | A1* | 7/2004 | Stiscia | H04L 63/0428 |
| | | | | 380/256 |
| 2004/0136712 | A1* | 7/2004 | Stiscia | H04L 12/5692 |
| | | | | 398/60 |
| 2006/0088319 | A1* | 4/2006 | Morton | H04B 10/506 |
| | | | | 398/79 |
| 2006/0177225 | A1* | 8/2006 | Paraschis | H04B 10/504 |
| | | | | 398/87 |
| 2011/0135305 | A1* | 6/2011 | Barnard | H04J 14/02 |
| | | | | 398/49 |
| 2011/0188866 | A1* | 8/2011 | Maeda | H04B 10/6164 |
| | | | | 398/202 |
| 2013/0330076 | A1* | 12/2013 | Liboiron-Ladouceur | |
| | | | | H04J 14/0267 |
| | | | | 398/47 |
| 2014/0286644 | A1* | 9/2014 | Oshima | H04B 10/11 |
| | | | | 398/118 |
| 2015/0117860 | A1* | 4/2015 | Braun | H04B 10/2575 |
| | | | | 398/58 |
| 2017/0005721 | A1* | 1/2017 | Erdmann | G01D 5/35351 |
| 2018/0269964 | A1* | 9/2018 | Mertz | G02B 6/02061 |
| 2018/0332371 | A1* | 11/2018 | Suzuki | H04Q 11/0005 |
| 2019/0020178 | A1 | 1/2019 | Oguri et al. | |
| 2020/0036446 | A1* | 1/2020 | Ge | H04B 10/075 |
| 2020/0287651 | A1* | 9/2020 | Jafari | H04L 1/0045 |
| 2020/0371295 | A1* | 11/2020 | Jones | H04L 49/357 |
| 2023/0198620 | A1* | 6/2023 | Lu | H04B 10/40 |
| | | | | 398/24 |
| 2024/0077781 | A1* | 3/2024 | Nahmias | G02F 1/212 |
| 2024/0113799 | A1* | 4/2024 | Liu | H04Q 11/0005 |
| 2024/0129039 | A1* | 4/2024 | Linnartz | H04B 10/11 |
| 2024/0137675 | A1* | 4/2024 | Chang | H04Q 11/0062 |

OTHER PUBLICATIONS

Ling Liao et al., "Silicon Photonics for Next-Generation Optical Connectivity,"May 19, 2023,2023 Optical Fiber Communications Conference and Exhibition (OFC), pp. 1-3.*

Dave Welch et al., Point-to-Multipoint Optical Networks Using Coherent Digital Subcarriers, Aug. 30, 2021, Journal of Lightwave Technology, vol. 39, No. 16, Aug. 15, 2021, pp. 5232-5235.*

S. J. Ben Yoo, "Optical Packet and Burst Switching Technologies for the Future Photonic Internet," Oct. 2, 2006, Journal of Light-wave Technology, vol. 24, No. 12, Dec. 2006, pp. 4468-4487.*

Damien Lambert et al., "3.2Tb/s Heterogeneous Photonic Integrated Circuit Chip in a Co-Packaged Optics Configuration,"May 19, 2023,2023 Optical Fiber Communications Conference and Exhibition (OFC), pp. 1-3.*

Extended European search report includes, pursuant to Rule 62 EPC, the European search report (R. 61 EPC) or the partial European search report/ declaration of no search (R. 63 EPC) and the European search opinion.. Application No. 25172202.1-1206, dated Oct. 14, 2025.

Silicon Photonics for Next-Generation Optical Connectivity, Ling Liao(I), Saeed Fathololoumi(I), Kimchau Nguyen(I), Hari Mahalingam(I), David Hui(I), John Heck(I), Harel Frish(2), Reece Defrees(2), Christian Malouin(I), Pegah Seddighian(I), Mengyuan Huang(I), Kadhair Al-hemyari(I), Yen-Jung Chen(I), Ye Wang(I), Wenhua Lin(I), Daniel Zhu(I), Richard Jones(I), Yuliya Akulova(I), Thomas Liljeberg(I); OFC 2023 © Optica Publishing Group 2023.

3.2Tb/s Heterogeneous Photonic Integrated Circuit Chip in a Co-Packaged Optics Configuration; Damien Lambert, Jeff Rahn, Majid Sodagar, Murtaza Askari, Paveen Apiratikut, John Spann, Thang Pham, Yishen Huang, Stephen Krasulick, OiSkorpios Technologies inc., 2706 Montopolis Dr, Austin, TX 78741, (IJ Meta Platforms, Inc., 14 Hacker Way, Menlo Park, CA 94025, OFC 2023 © Optica Publishing Group 2023.

* cited by examiner

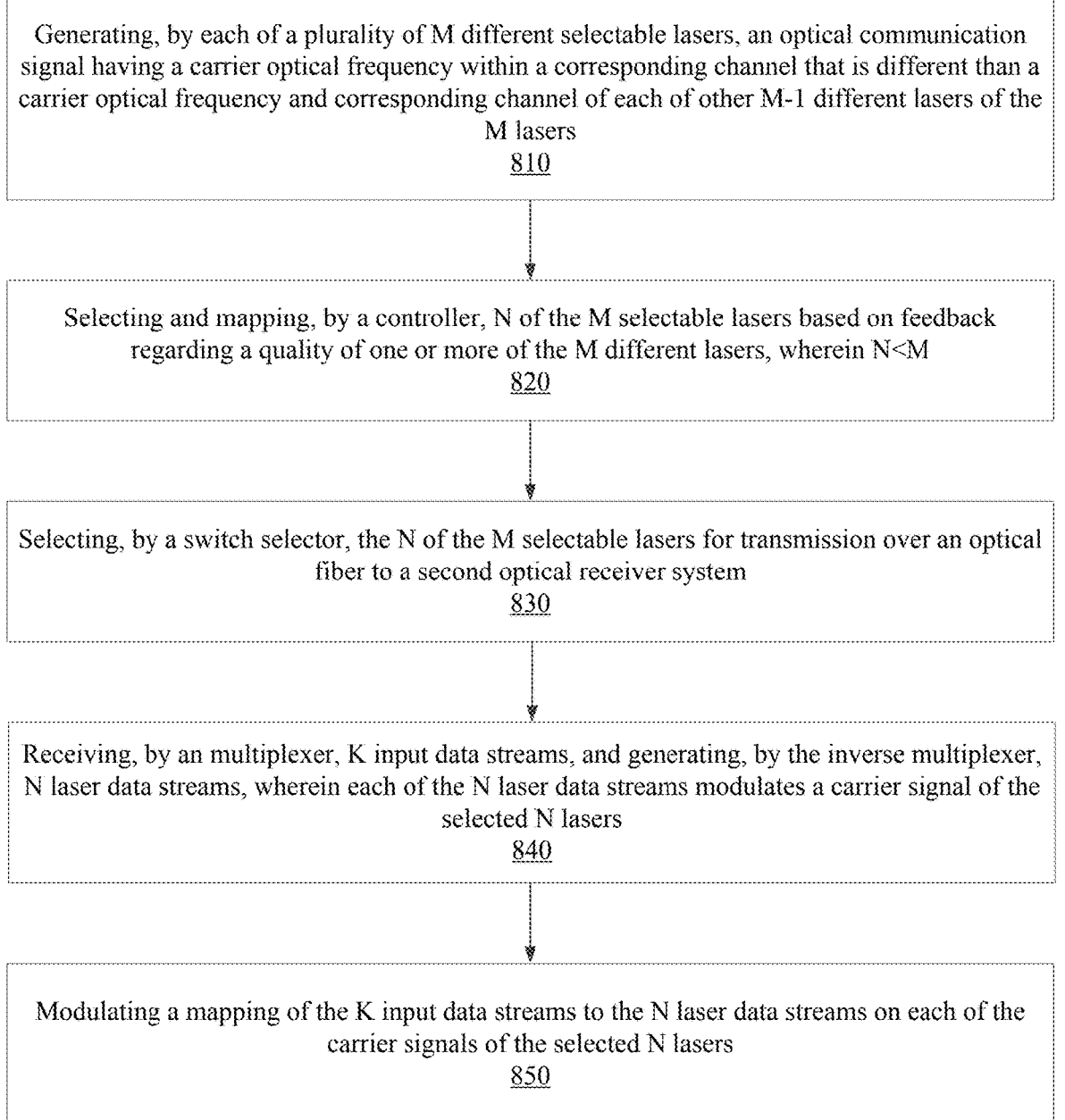

Generating, by each of a plurality of M different selectable lasers, an optical communication signal having a carrier optical frequency within a corresponding channel that is different than a carrier optical frequency and corresponding channel of each of other M-1 different lasers of the M lasers
810

Selecting and mapping, by a controller, N of the M selectable lasers based on feedback regarding a quality of one or more of the M different lasers, wherein N<M
820

Selecting, by a switch selector, the N of the M selectable lasers for transmission over an optical fiber to a second optical receiver system
830

Receiving, by an multiplexer, K input data streams, and generating, by the inverse multiplexer, N laser data streams, wherein each of the N laser data streams modulates a carrier signal of the selected N lasers
840

Modulating a mapping of the K input data streams to the N laser data streams on each of the carrier signals of the selected N lasers
850

Figure 8

OPTICAL COMMUNICATION SYSTEM

RELATED PATENT APPLICATIONS

This patent application claims priority to U.S. Provisional Patent Application Ser. No. 63/648,413 filed May 16, 2024, which is herein incorporated by reference.

FIELD OF THE DESCRIBED EMBODIMENTS

The described embodiments relate generally to optical communications. More particularly, the described embodiments relate to systems, methods, and apparatuses for an optical communication system.

BACKGROUND

Much of cloud-based infrastructure is based on storage and processing of data by large numbers of servers in data centers. These servers are connected through a switch network in various configurations. Data centers increasingly rely on interconnects for delivering critical communications connectivity among numerous servers, memory, and computation resources. Data center interconnects have turned to optical communications, and the recent acceleration in data center requirements is expected to further drive optical interconnect technologies deeper into the systems architecture.

However, the lasers that generate optical signals to be carried by optical fibers within data centers are unreliable and can have a short life.

It is desirable to have methods, apparatuses, and systems for optical communication systems that can be utilized within data centers.

SUMMARY

An embodiment includes an optical communication system. The optical transmitter system includes M different selectable lasers, each of the M different lasers configured to generate an optical communication signal having a carrier optical frequency within a corresponding channel that is different than a carrier optical frequency and corresponding channel of each of other M−1 different lasers of the M lasers, a controller configured to select and map N of the M selectable lasers based on feedback regarding a quality of one or more of the M different lasers, wherein N<M, a switch selector configured to select the N of the M selectable lasers for transmission over an optical fiber to a second optical receiver system, and a multiplexer configured to receive K input data streams and generate N laser data streams, wherein each of the N laser data streams modulates a carrier signal of the selected N lasers, and wherein a mapping of the K input data streams to the N laser data streams is modulated on each of the carrier signals of the selected N lasers.

Another embodiment includes a method of an optical communication system. The method includes generating, by each of a plurality of M different selectable lasers, an optical communication signal having a carrier optical frequency within a corresponding channel that is different than a carrier optical frequency and corresponding channel of each of other M−1 different lasers of the M lasers, selecting and mapping, by a controller, N of the M selectable lasers based on feedback regarding a quality of one or more of the M different lasers, wherein N<M, selecting, by a switch selector, the N of the M selectable lasers for transmission over an optical fiber to a second optical receiver system, and receiving, by a multiplexer, K input data streams, and generating, by the multiplexer, N laser data streams, wherein each of the N laser data streams modulates a carrier signal of the selected N lasers, and wherein a mapping of the K input data streams to the N laser data streams is modulated on each of the carrier signals of the selected N lasers.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 8 is a flow chart that includes steps of a method of an optical transmitter system, according to an embodiment.

DETAILED DESCRIPTION

Figure 1:
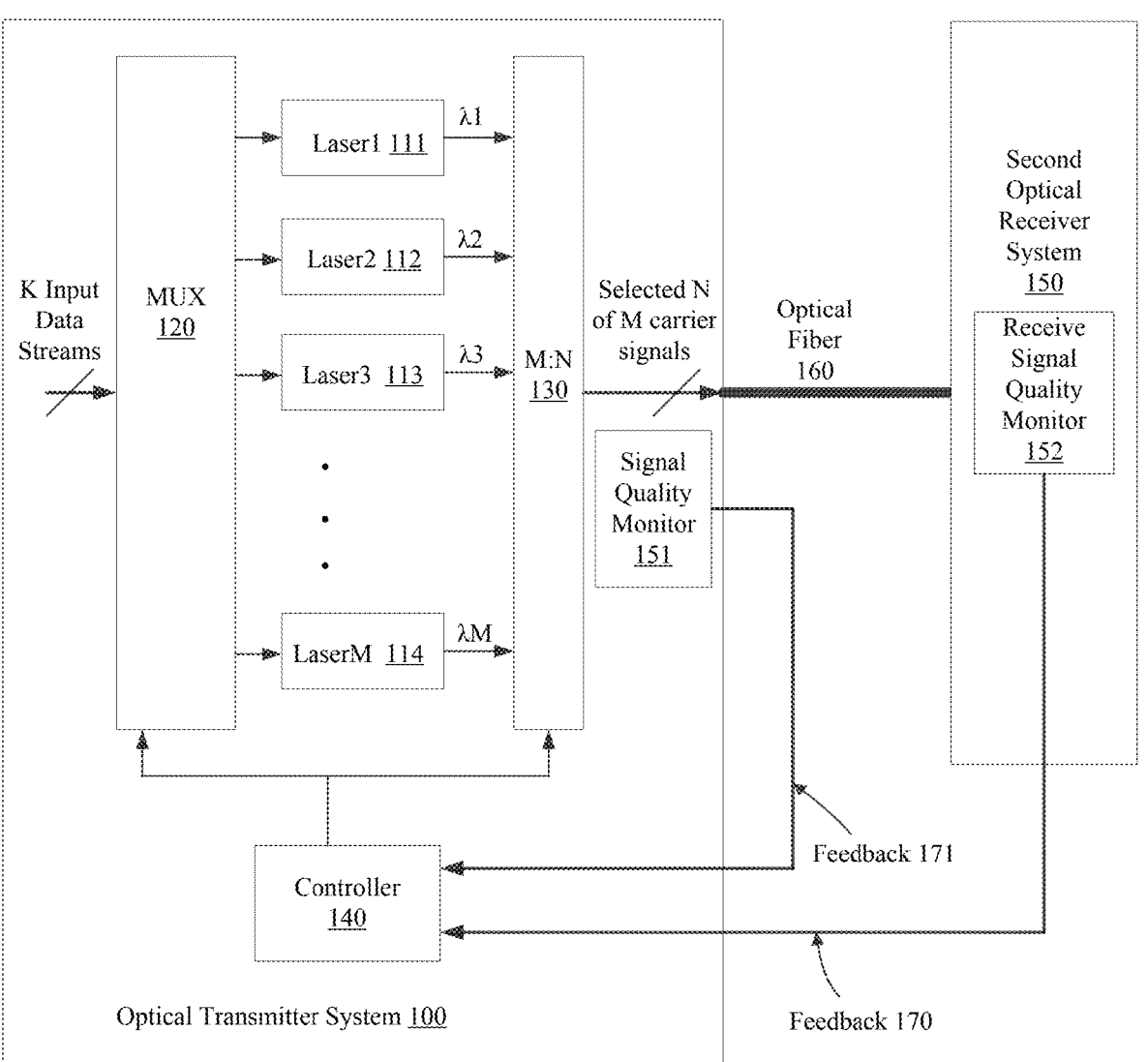
FIG. 1 shows an optical transmitter system, according to an embodiment.

The embodiments described include methods, apparatuses, and systems for an optical communication system. For an embodiment, an optical transmitter system of the optical communication system includes M different selectable lasers, each of the M different lasers configured to generate an optical communication signal having a carrier optical frequency within a corresponding channel that is different that a carrier That is, the carrier optical frequency of each of the M different lasers in within a different channel. The optical transmitter system further includes a controller that is configured to select and map N of the M selectable lasers based on feedback of a quality of one or more of the M lasers, wherein N<M. For an embodiment, the N lasers each generate an optical carrier signal having a signal quality better than a predetermined threshold. For an embodiment, the N lasers each generate an optical carrier signal having a signal quality that is one of the N best. The optical transmitter system further includes a switch selector configured to select the N of the M selectable laser for transmission over an optical fiber to a second optical receiver system, and a multiplexer configured to receive K input data streams and generate N laser data streams, wherein each of the N laser data streams modulates a carrier signal of the selected N lasers. For an embodiment, a mapping of the K input data streams to the N laser data streams is modulated on each of the carrier signals of the selected N lasers. For an embodiment, data speeds on the different channels of the different carrier optical frequencies can be or are different.

A specific implementation of the optical transmitter system includes 16 (N) lasers fully operational until the end of life of the optical communication system. For example, the optical transmitter system may be required to be operational for 5 years in a data center with a probability of 99.999%. Performing a reliability analysis assuming an operating environment may indicate that 2 lasers will fail with a certain probability. To ensure operation of the 16 lasers, the results of the analysis suggest that operation be started with 18 (M) lasers, with the assumption that 2 of the lasers will fail over the useful lifetime of the system.

For an embodiment, burn-in of the lasers can additionally be accounted for in the redundancy. If the yield loss after burn-in is <=10%, the number M of lasers may be selected to be 20, thereby accounting for burn-in failure and end of life failure. Increasing the number of M lasers to 22 may yield a 50% chance that there will be 20 operational lasers out of 22, thereby accounting for increasing wafer production yield.

At least some embodiments include increasing the value of M further to accommodate for manufacturing yield, elimination of burn-in etc.

An exemplary 800 Gbps optical transmitter system includes 16 operational lasers, with each laser having a payload data rate of 50 Gbps, and a coding overhead of 6 Gbps. Therefore, each laser must carry 56 Gbps. In order to realize 16 operational lasers in operation at the end of a 5-year useful life, factors including reliability calculations, environment of operation, data from accelerated testing, etc. Computing based on these factors suggests that 18 lasers are needed to guarantee 16 operational lasers. Further, burn-in tests indicate a loss of 1 laser out of 19 for a 5-year burn-in, suggesting 19 lasers are needed to be packaged. Further, it can be determined that production of just 19 lasers in the array results in a manufacturing yield that is extremely small (<10%). Empirical data and defect analysis suggests that 3 more lasers need to be added to increase the manufacturing yield to 50%. This all suggests that 22 lasers in the array are needed to provide a 50% manufacturing yield, elimination of the burn-in process, and to ensure 16 laser operating laser at the end of life.

For an embodiment, the optical transmitter system is formed on an integrated circuit. For an embodiment, the integrated circuit may support a total bandwidth for the optical transmitter system of 4.4 THz. If the carrier optical frequency each of the lasers of the optical transmitter system is spaced 200 GHz from the other lasers, then a total of only 22 different lasers may be formed, thereby limiting the number M of possible lasers in which the N lasers are selected. As previously described, for an embodiment, data speeds on the different channels of the different carrier optical frequencies can be or are different.

FIG. 1 shows an optical communication system, according to an embodiment. As shown, an optical transmitter system 100 includes M different selectable lasers 111, 112, 113, 114, wherein each of the M different lasers 111, 112, 113, 114 is configured to generate an optical communication signal having a carrier optical frequency within a corresponding channel that is different that a carrier optical frequency and corresponding channel of each of the other M−1 different lasers of the M lasers. As previously described, the M different selectable lasers are utilized to ensure through redundancy that at least N of the required number of lasers are operational over the lifetime of the optical communication system. The channels corresponding with each of the carrier optical frequencies of each of the M laser have designated center frequencies and frequency passbands, wherein the passbands of each of the channels are substantially non-overlapping in frequency.

For an embodiment, a controller 140 is configured to select and map N of the M selectable lasers, wherein N<M. As will be described, the N lasers are selected to ensure a level of performance of N optical carrier signals propagating across an optical fiber 160 to a second optical receiver system 150. Further, as described, the redundancy accounts for possible failure of one or more of the M lasers. Further, the performance of the M lasers can be monitored over time, and the N laser can be selected to ensure a preselected level of performance of the N optical carrier signals being communicated across an optical fiber 160 to a second optical receiver system 150. For an embodiment, the selection of the N of the M selectable lasers is based on feedback regarding a quality of one or more of the M different lasers.

For an embodiment, a switch selector 130 is configured to select the N of the M selectable lasers for transmission over the optical fiber 160 to the second optical receiver system 150. For an embodiment, the N laser selected are active (powered), and the other M-N lasers are off (not powered). For an embodiment, all M lasers are active (powered) and the N lasers are selected to carry data streams.

For an embodiment, a multiplexer 120 is configured to receive K input data streams and generate N laser data streams. The K input data streams can be of varied data rates. For example, any one of the K input data streams may be 200 Gbps or 100 Gbps while each of the N laser data streams may be 50 Gbps. Any of the K input data streams may be 50 Gbps or 25 Gbps, while each of the N laser data streams may be 50 Gbps. For an embodiment, the K input data streams are mapped to N laser data streams. The N selection is determined from the M lasers, and then the mapping of the K input data streams can be determined from the selected N lasers. For an embodiment, the second optical receiver system 150 needs to know the mapping of the K input data streams to the N laser data streams so the that the second optical receiver system can reconstruct the K input data streams after transmission through the optical fiber 160. Accordingly, for an embodiment the mapping of the K input data steams to the N selected lasers is communicated to the second optical receiver system 150.

For an embodiment, the mapping of the N of the M selectable lasers is modulated on each of the carrier signals of the selected N lasers. For an embodiment, the mapping of the K input data steams to the N selected lasers is modulated on each of the carrier signals of the selected N lasers. For an embodiment, the second optical receiver system 150 needs to know which of the M lasers are selected so that the second optical receiver system 150 knows the frequency or wavelength in which the N carrier signals and channels of the N lasers are located. Accordingly, for an embodiment, all N of the carrier signals carry the mapping of the N of the M selectable lasers. For an embodiment, the mapping is included with all M carrier signals of which N are selected for transmission across the optical fiber 160. For an embodiment the mapping is included over at least a time interval, wherein the second optical receiving system knows when the time interval occurs.

As described, the M lasers are available for selecting the N laser to provide redundancy. That is, the laser can have a limited projected end of life. Accordingly, additional lasers can be included and selected from to ensure that at least a minimum number N of the laser are available for use. For an embodiment, the number M is selected based on knowledge and estimates of the projected end of life of the M different selectable lasers. It is to be understood that the number of M different selectable lasers can additionally be selected based on a burn-in rate of the lasers, and/or a manufacturing yield of the lasers. For an embodiment, the redundancy of the transmission system allows for elimination of "Infant mortality testing" of the lasers, sudden failures of the lasers in field, and long-term gradual wear-out of the lasers in field.

As previously described, the N selected lasers are selected based on a signal quality of each of the transmission signals of each of the M lasers. For an embodiment, the N selected lasers are selected from the M lasers based on a transmit power of N modulated carrier signals. For an embodiment, the N selected lasers are selected from the M lasers based on a signal quality or characteristic of the N modulated carrier signals. For an embodiment, the N selected lasers are selected from the M lasers based on an estimated BER (bit error rate) of N modulated carrier signals. For an embodiment, the N selected lasers are selected from the M lasers based on wavelength of N modulated carrier signals. For an embodiment, the N selected lasers are selected from the M lasers based on Side Mode Suppression Ratio (SMSR) of N modulated carrier signals.

As shown, for an embodiment, the controller 140 receives feedback 171 from a signal quality detector 151 within the optical transmitter system 100. For an embodiment, the signal quality detector is as simple as a power detector of each of the N carrier signals. However, the signal quality detector can additionally or alternatively include other types of signal quality detectors. Further, as shown in FIG. 1, for an embodiment, feedback 170 from the second optical receiver system 150 includes receive signal quality monitor 152 of the N carrier signals received by the second optical receiver system 150. For an embodiment, two-way communication is supported by having optical transmitter systems and optical receiver systems on both sides of the optical fiber 160.

For an embodiment, the controller 140 is further configured to receive feedback from the second optical receiver system of the N modulated lasers, and adaptively update the mapping of the N of the M selectable lasers based on the received feedback. For an embodiment, the feedback includes measured values of the signal qualities of each of the N modulated carrier signals. The feedback 170 provides real time or near real time feedback on the performance of the modulated carriers of the N selected lasers. For an embodiment, upon startup, the selection provides a set of N selected lasers that meet a threshold level of communication quality. For an embodiment, upon startup, the selection provides a set of N selected lasers that provide the best level of communication quality. During operation, continual selection provides adaptive updating that meets the threshold level of communication quality, or the best level of communication quality.

For an embodiment, the controller 140 is further configured to track a history of the mapping over time, document the failed lasers, and adaptively influence the selection of the N selected laser based on the history of the mapping. For example, tracking the performance over time can provide an indication of a particular one or more of the N selected laser in which the performance is degrading over time. Such degradation can be used to trigger a reselection of the N select lasers. Alternatively, the degradation may provide an indication that one or more lasers will fail, and therefore, trigger checking the selection of the N laser more frequently. For an embodiment, the indication that one or more of the lasers will fail triggers a reselection of the N laser that does not include the failing or previously failed laser.

For an embodiment, the controller 140 is further configured to code selected and non-selected lasers with the same code and track a signal quality of both the selected and non-selected lasers. For example, during a testing or calibration period or periods, the N selected lasers may be varied in order that unselected lasers may be tested as well. Using the same coding on all the carrier signals allows for even or fair testing and selection of the N lasers. Further, an order or sequence of the selected N carrier signal may be tested for optimally testing signal quality and inter channel interference (ICI). An embodiment includes periodically (or triggered) testing of the non-selected laser over time. Therefore, the selected N lasers can be adapted over time.

For an embodiment, the controller 140 is further configured to receive feedback from the second optical receiver system 150 of the N modulated lasers, and adaptively adjust a coding of data streams of the modulated carriers. For an embodiment, the feedback includes a received signal quality which is tracked over time, and wherein the coding is increased for select of the N modulated carrier signals as the received signal quality of one or more of the N modulated carrier signals degrades over time. For an embodiment, a threshold level of communication quality may be required of each of the carrier signals to ensure a threshold level of performance of the communication of the N carrier signals across the optical fiber 160. Accordingly, an embodiment includes increasing coding of one or more of the N carrier signals to ensure that all of the N carrier signals meet the threshold level of communication quality.

For an embodiment, the controller 140 is further configured to receive feedback from a receiver of the N modulated lasers, and adaptively adjust an amplitude (power level) of the modulated carriers. For an embodiment, the feedback includes a received signal quality which is tracked over time, and a bias current is increased for select of the N selected lasers as the received signal quality of one or more of the N modulated carrier signals degrades over time.

For an embodiment, MAC (media access control) packets included as information within the modulated carrier signals of the N selected lasers include the mapping of the selection of the N of the M selectable lasers, thereby conveying the mapping to an optical receiver of the modulated carrier signals. For an embodiment, MAC (media access control) packets included as information within the modulated carrier signals of the N selected lasers include the mapping of the selection of the K bit steams to the N laser data streams, thereby conveying the mapping to an optical receiver of the modulated carrier signals.

Figure 2:
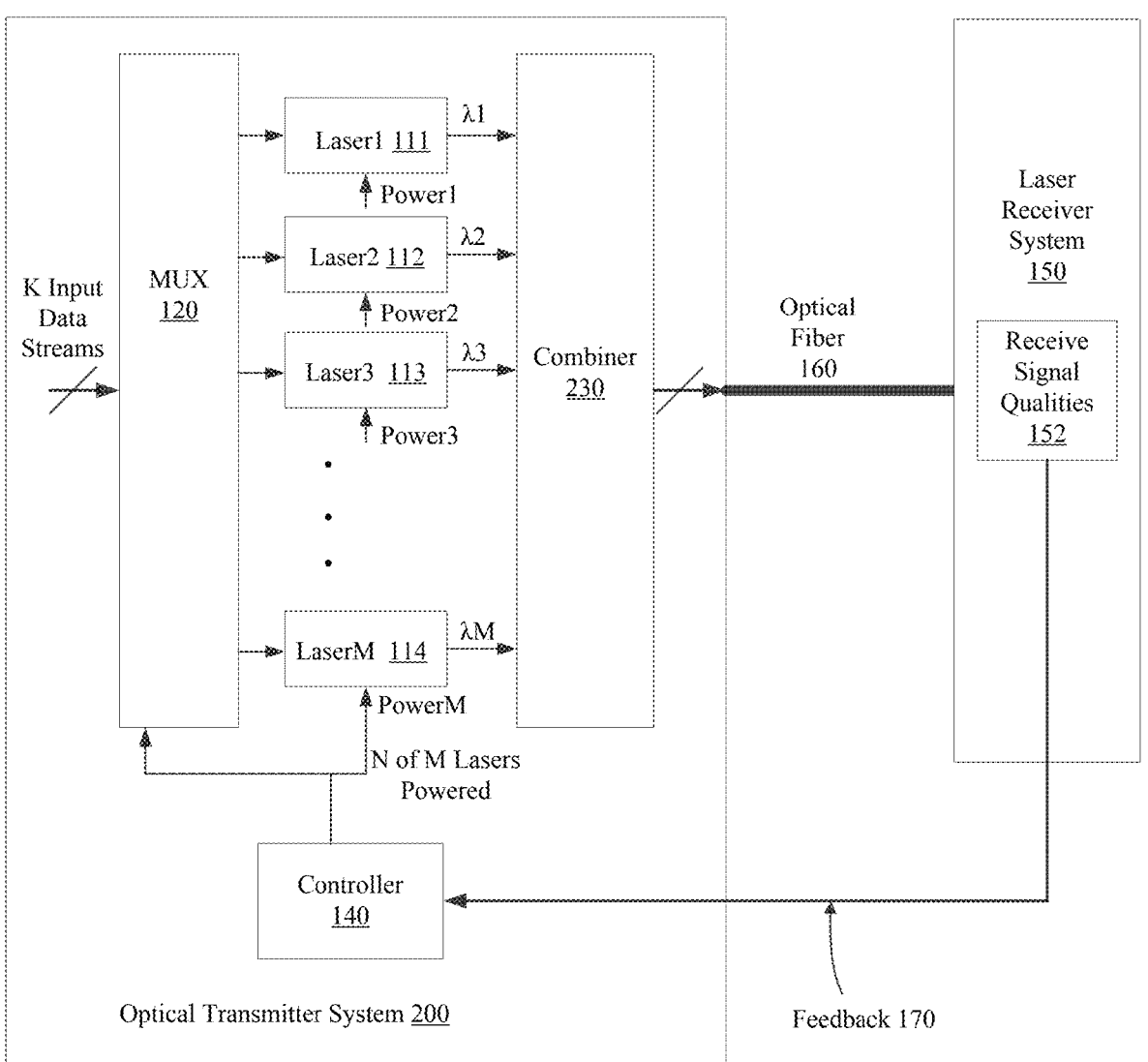
FIG. 2 shows an optical transmitter system, according to another embodiment.

FIG. 2 shows an optical transmitter system 200, according to another embodiment. For this embodiment, the N selected lasers are selectively powered by the controller 140. This embodiment could advantageously reduce the amount of power consumed by the optical transmitter system 200 because some of the lasers are not powered. The combiner 230 receives the outputs from the active lasers and combines the outputs to the optical fiber 160. That is, no laser selection is made by the combiner 230. Further, by not powering the unselected lasers, the unselected laser will be less likely to degrade over time. Therefore, if an unselected laser is later selected, then a prior characterization of a quality of the carrier signal of the unselected laser will likely still be a valid characterization.

Figure 3:
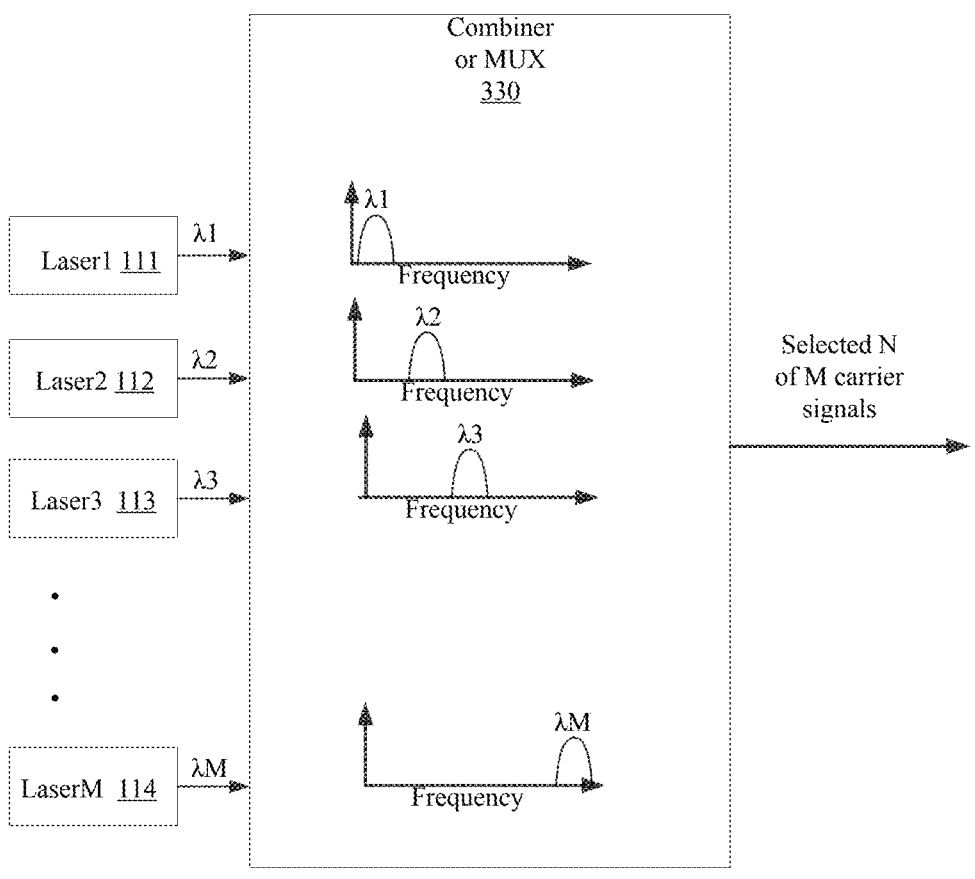
FIG. 3 shows passband filtering of each carrier signal of an optical transmitter system, according to an embodiment.

FIG. 3 shows passband filtering of each carrier signal of an optical communication system, according to an embodiment. As shown, the output of each of the lasers can be filtered by a bandpass filter (of a combiner or MUX 330) that is ideally centered at the wavelength of the corresponding carrier signal of the laser. The filtering reduces inter-channel interference (ICI) between carrier optical signals. For an embodiment, M different bandpass filters provide filtering of all M carrier optical signals of the M lasers. When only N of the M laser is active, the filtering occurs for the N carrier signals of the N lasers. However, the M bandpass filters are still present because the selected N of the M lasers can change at any time. For an embodiment, the bandpass filters are frequency aligned with the corresponding channel of each of the carrier optical frequencies of the M lasers.

Figure 4:
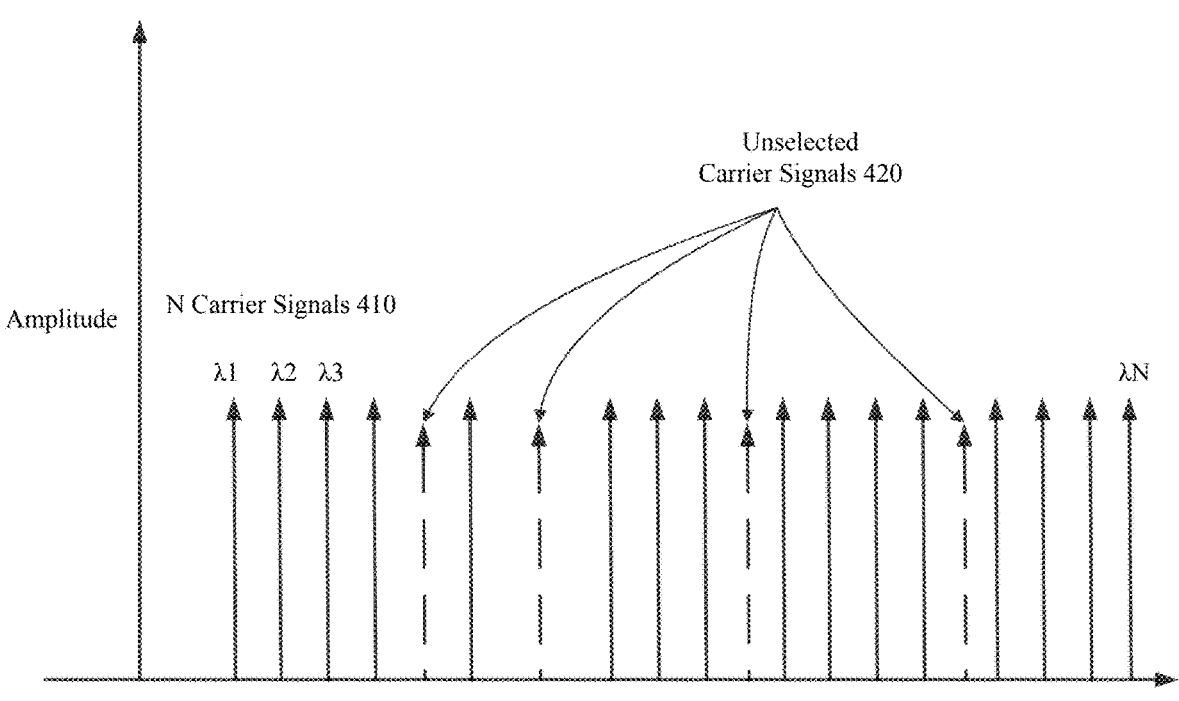
FIG. 4 is a frequency spectrum of carrier signals of the optical transmitter system, according to an embodiment.

FIG. 4 is a frequency spectrum of carrier signals of the optical communication system, according to an embodiment. For an embodiment, the carrier signals are spaced 200 GHz apart from each other. As shown, the frequency spectrum may include the selected N carrier signals 410, and unselected carrier signals 420 of the M lasers. As previously described, the selection of the N lasers of the N carrier signals can be based on various communication quality parameters. For an embodiment, the N lasers are selected to provide the best level of communication quality. For an embodiment, the N lasers are selected to provide at least a threshold level of communication quality.

Figure 5:
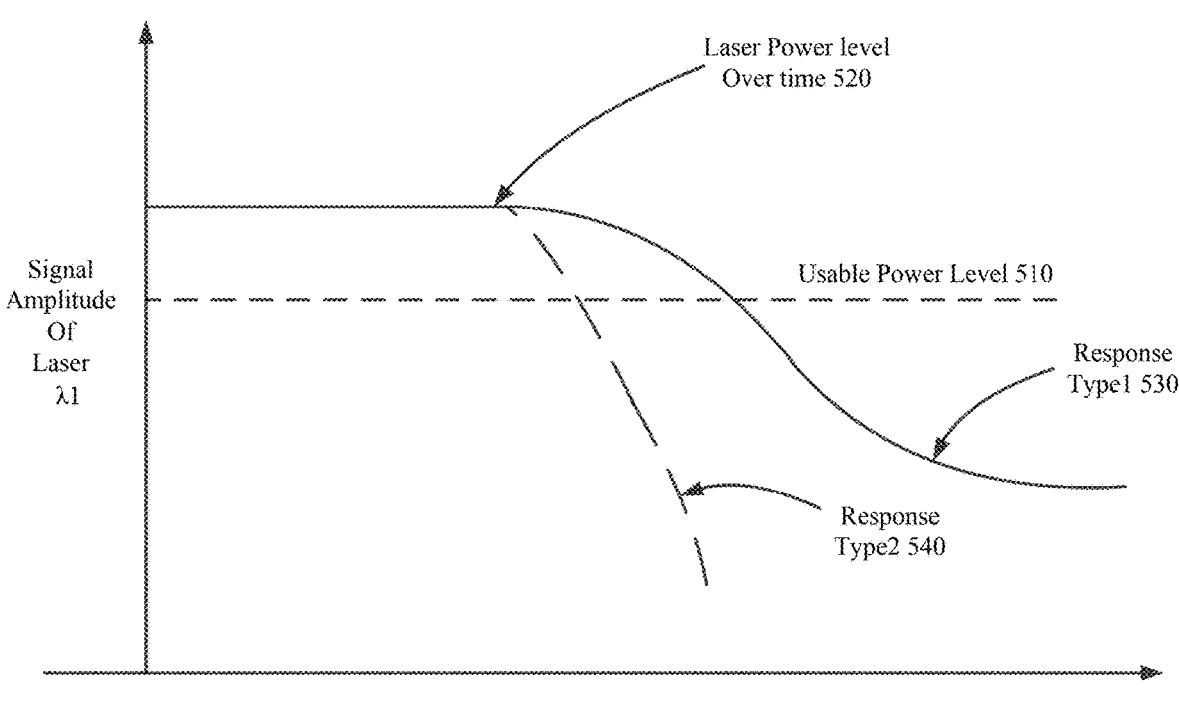
FIG. 5 shows power curves of a laser, according to an embodiment.

FIG. 5 shows power curves of a laser, according to an embodiment. As shown, the power level output of one or more of the M lasers may degrade over time. The units of time for the power curve (laser power level over time 520) of FIG. 5 may be small (fractional seconds) or very large (months or years). However, an expected life of the lasers can be estimated based on a rate of change of the power curve of the laser. Different power curves may exhibit different characteristics that can be used to identify specific or general potential problems with the laser. A first response type1 530 may degrade slowly. A second response type2 540 may degrade more quickly. The different degradation characteristics can be used to categorize and predict the life of the lasers. The sensed degradation of the lasers can be used to select how frequently to test the quality of each laser and reselect the N lasers. The sensed degradation of the lasers can be used to identify a laser to avoid selecting the degraded laser. As long as the output (signal amplitude) of the laser is above a usable power level 510, the laser may be selected for use.

In general, the failure modes of the lasers can be characterized into 3 different types: 1) infant mortality which happens at the very early stage, and is usually screened by burn in, 2) sudden failure which results in significant power drop in a short time frame, but can happen at a random time along the whole lifetime span of the laser, 3) gradual wear out which show a degradation trend over time, wherein some lasers can reach the performance threshold earlier, some lasers later. If a signal carrier of a laser degrades below a selected quality threshold (useable power level 510), then a laser selection or reselection needs to be made to switch to using a different set of N lasers to ensure a desired level of performance of the optical transmitter system. Besides an output power drop, there are also other scenarios of laser degradation, such as, stress-relaxation induced wavelength change and bandwidth (modulation speed) change.

Figure 6:
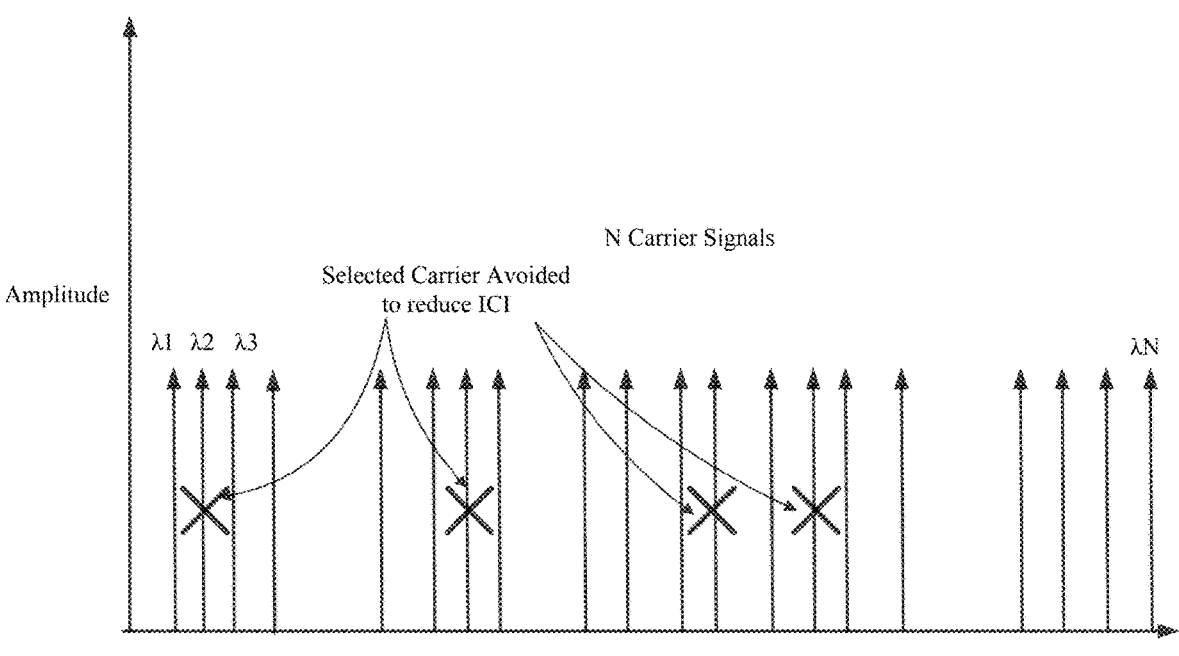
FIG. 6 shows a frequency spectrum of carrier signals of the optical transmitter system in which carrier signals are selected to reduce inter-channel interference, according to an embodiment.

FIG. 6 shows a frequency spectrum of carrier signals of the optical transmitter system in which carrier signals are selected to reduce inter-channel interference, according to an embodiment. ICI can occur between different carrier signals of the N carrier signals. An embodiment includes mitigating ICI between carriers through the selection of the N carriers. That is, for example, if adjacent carrier signals suffer from a greater amount of ICI than desired, the carrier frequency locations can be adjusted through a reselection of the N lasers. For an embodiment, the N selected lasers are selected to maintain a selected frequency/wavelength spacing between each or one or more of the N carrier signals.

Figure 7:
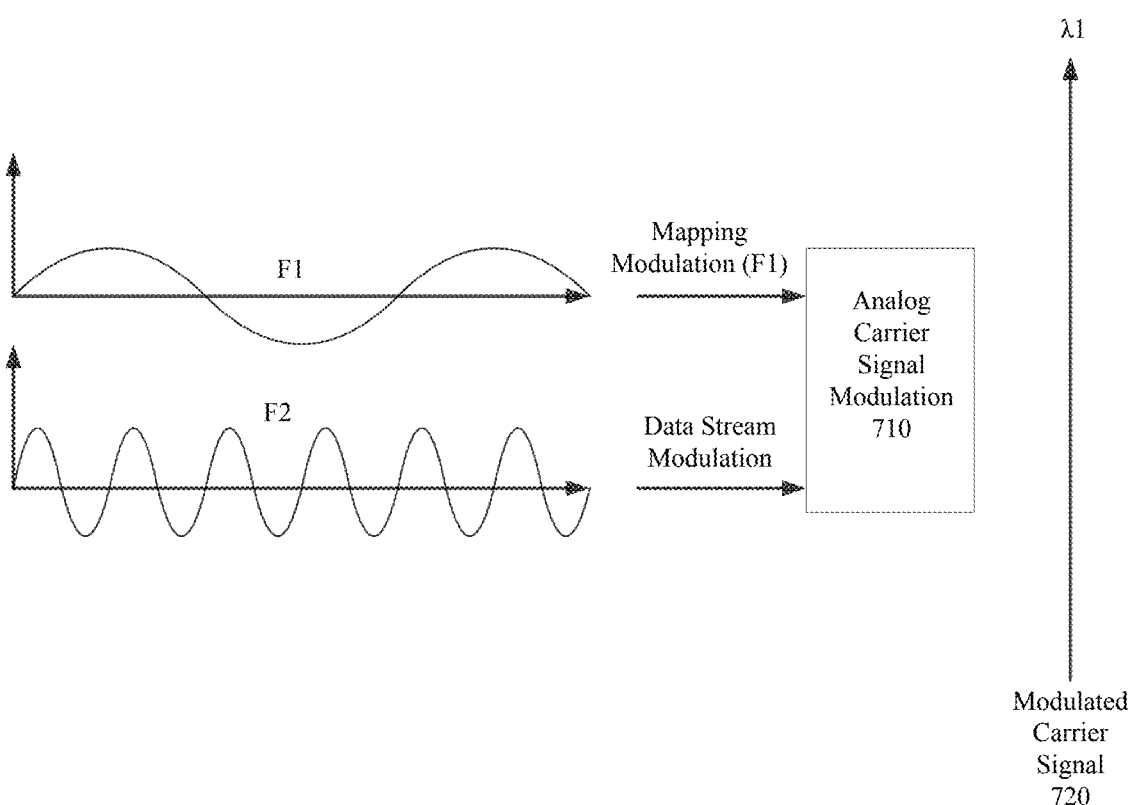
FIG. 7 shows a data stream signal and a mapping signal analog modulated onto a carrier signal, according to an embodiment.

FIG. 7 shows a data stream signal and a mapping signal analog modulated onto a carrier signal, according to an embodiment. As previously described, the mapping is communicated from the optical transmitter system 100 to the second optical receiver system 150. For an embodiment, the modulation of the carrier signals is implemented as analog modulation to reduce the need for DACs (digital to analog converters) and ADCs (analog to digital converters) which reduces power consumption of the optical transmitter system 100.

FIG. 7 shows mapping modulating 710 a carrier signal 720 at a modulation rate of F1, and the data stream (laser data stream) modulating 710 the carrier signal 720 at a modulation rate of F2. Accordingly, the laser data stream and the mapping can be recovered at the optical receiver system 150 by demodulating the carrier signal and determining the laser data stream by filtering for the F2 frequency and determining the mapping by filtering for the F1 frequency. As previously described, the mapping can include the mapping of the K bit streams to the N laser bit streams. Further, the mapping can include the mapping of the selected N of the M lasers.

FIG. 8 is a flow chart that includes steps of a method of laser transmission, according to an embodiment. A first step 810 includes generating, by each of a plurality of M different selectable lasers, an optical communication signal having a carrier optical frequency within a corresponding channel that is different than a carrier optical frequency and corresponding channel of each of other M−1 different lasers of the M lasers. A second step 820 includes selecting and mapping, by a controller, N of the M selectable lasers based on feedback regarding a quality of one or more of the M different lasers, wherein N<M. A third step 830 includes selecting, by a switch selector, the N of the M selectable lasers for transmission over an optical fiber to a second optical receiver system. A fourth step 840 includes receiving, by a multiplexer, K input data streams, and generating, by the multiplexer, N laser data streams, wherein each of the N laser data streams modulates a carrier signal of the selected N lasers. A fifth step 850 includes modulating a mapping of the K input data streams to the N laser data streams on each of the carrier signals of the selected N lasers.

As described, each of the carrier optical frequencies corresponds with a different communication channel. For an embodiment, the passband of each of the communication channels are not overlapping over the useful range of frequencies within each of the passbands.

At least some embodiments further include reselecting and mapping a new N of the M selectable lasers based on the quality received via the feedback. That is, over time the quality of the selected lasers may vary, and a reselection of the N of the M possible laser is made based on the feedback of the quality of the selected N lasers.

As previously described, for an embodiment, the optical transmitter system receives K input data streams. For an embodiment, the K input data streams are mapped to the selected N lasers after the N of the M selectable laser are mapped. As previously described, the K input data streams can be of varied data rates. For example, any one of the K input data streams may be 200 Gbps or 100 Gbps while each of the N laser data streams may be 50 Gbps. Any of the K input data streams may be 50 Gbps or 25 Gbps, while each of the N laser data streams may be 50 Gbps. For an embodiment, the K input data streams are mapped to N laser data streams. The N selection is determined from the M lasers, and then the mapping of the K input data streams can be determined from the selected N lasers. For an embodiment, the second optical receiver system needs to know the mapping of the K input data streams to the N laser data streams so the that the second optical receiver system can reconstruct the K input data streams after transmission through the optical fiber. Accordingly, for an embodiment the mapping of the K input data steams to the N selected lasers is communicated to the second optical receiver system.

For an embodiment, the switch selector selectively activates the N of the M lasers, wherein the unselected lasers are not activated. That is, unselected lasers are not activated which saves power and can extend the life of the unselected lasers. For an embodiment, quality characterizations of the lasers performed at one time are assumed to be retained for an unselected laser at a later time.

For an embodiment, mapping of the N of the M selectable lasers is modulated on M lasers. For an embodiment, mapping of the K input data stream to the N laser data streams is modulated on M lasers. Accordingly, the second optical receiver system can determine the mappings.

As previously described, for an embodiment, M is selected based on at least a projected end of life of the M different selectable lasers. As previously described, each laser can have a limited projected end of life. Accordingly, additional lasers can be included and selected from to ensure that at least a minimum number N of the lasers are available for use. For an embodiment, the number M is selected based on knowledge and estimates of the projected end of life of the M different selectable lasers. It is to be understood that the number of M different selectable lasers can additionally be selected based on a burn-in rate of the lasers, and/or a manufacturing yield of the lasers. For an embodiment, the redundancy of the transmission system allows for elimination of "Infant mortality testing" of the lasers, sudden failures of the lasers in field, and long-term gradual wear-out of the lasers in field.

As previously described, for an embodiment, the N selected lasers are selected based on a signal quality of each of the transmission signals of each of the M lasers. The signal quality can be determined in several different ways. For an embodiment, the N selected lasers are selected from the M lasers based on an estimated BER (bit error rate) of N modulated carrier signals. For an embodiment, the N selected lasers are selected to maintain a selected frequency spacing between each of the N carrier signals.

For an embodiment, MAC packets included as information within the modulated carrier signals of the N selected lasers include the mapping of the selection of the N of the M selectable lasers, thereby conveying the mapping to an optical receiver of the modulated carrier signals. Alternatively, or additionally, the information within the MAC packets includes the mapping of the K input data streams to the N laser data streams of the N selected lasers.

An embodiment further includes receiving feedback from a receiver of the N modulated lasers, and adaptively updates the mapping of the N of the M selectable lasers based on the received feedback. For an embodiment, the feedback includes measured values of the signal qualities of each of the N modulated carrier signals. Alternatively, or additionally, feedback is generated internally to the optical transmitter system and feedback to the controller.

An embodiment further includes tracking a history of the mapping over time, and adaptively influence the selection of the N selected laser based on the history of the mapping. For example, tracking the performance over time can provide an indication of a particular one or more of the N selected laser in which the performance is degrading over time. Such degradation can be used to trigger a reselection of the N select lasers. Alternatively, the degradation may provide an indication that one or more lasers will fail, and therefore, trigger checking the selection of the N laser more frequently. For an embodiment, the indication that one or more of the lasers will fail triggers a reselection of the N laser that does not include the failing or previously failed laser.

An embodiment further includes coding selected and non-selected lasers with a same code and tracking a signal quality of both the selected and non-selected lasers. Non-selected lasers can be tracked by periodically or intermittently selecting the non-selected laser for characterization. However, an embodiment includes running an initial characterization of the M lasers. The initial characterization can be used to determine which lasers out of M are good-performing lasers, and the total number of good-performing (the best or better than a quality threshold) should be greater than N. For an embodiment, the N lasers are then selected, leaving several known good spare lasers (non-selected lasers). The other of the M non-selected lasers are power-off until they are to replace a failed laser. For an embodiment, it is assumed that the non-selected laser will not degrade during the time the lasers are power off, and therefore, the non-selected lasers do not need to be characterized at a later time. For an embodiment, when one or more of the N selected lasers needs to be replaced, then the entire M lasers can be recharacterized to ensure that the replacement laser is working as desired.

As previously described, an embodiment includes receiving feedback from a receiver of the N modulated lasers, and adaptively adjusts a coding of data streams of the modulated carriers. For an embodiment, the coding is across multiple carrier signals. For an embodiment, the coding is across carrier signals of the N selectable lasers. For an embodiment, the coding is across carrier signals of the M selectable lasers. As previously described, for an embodiment the feedback includes a received signal quality which is tracked over time, and wherein coding is increased for select of the N modulated carrier signals as the received signal quality of one or more of the N modulated carrier signals degrades over time.

As previously described, an embodiment includes receiving feedback from one or more sensors located within the optical transmitter system. As previously described, an embodiment includes receiving feedback from one or more sensors located within the second optical receiver system. Further, an embodiment includes receiving feedback from both the one or more sensors located within the optical transmitter system and from the one or more sensors located within the second optical receiver system. For an embodiment, the feedback includes signal quality (for example, power level) of the carrier signals of the optical lasers.

An embodiment includes adaptively adjusts an amplitude (power level) of the modulated carriers based on the feedback of the signal quality. For an embodiment, the feedback includes a received signal quality which is tracked over time, and wherein a bias current is increased for select of the N modulated carrier signals as the received signal quality of one or more of the N modulated carrier signals degrades over time.

As previously described, for an embodiment, a second optical transmitter system associated with the second optical receiver system configured to generate a second set of carrier signals for transmission over the optical fiber to an optical receiver system associated with the optical transmitter system. For an embodiment, the carrier frequencies (wavelengths) of the second set a carrier signals are selected to result in a frequency guard band between the second set of carrier signals and the carrier frequencies (wavelengths) of the M different lasers, wherein the guard band is selected to reduce ICI between the optical transmitter system and the second optical transmitter system.

Figure 9:
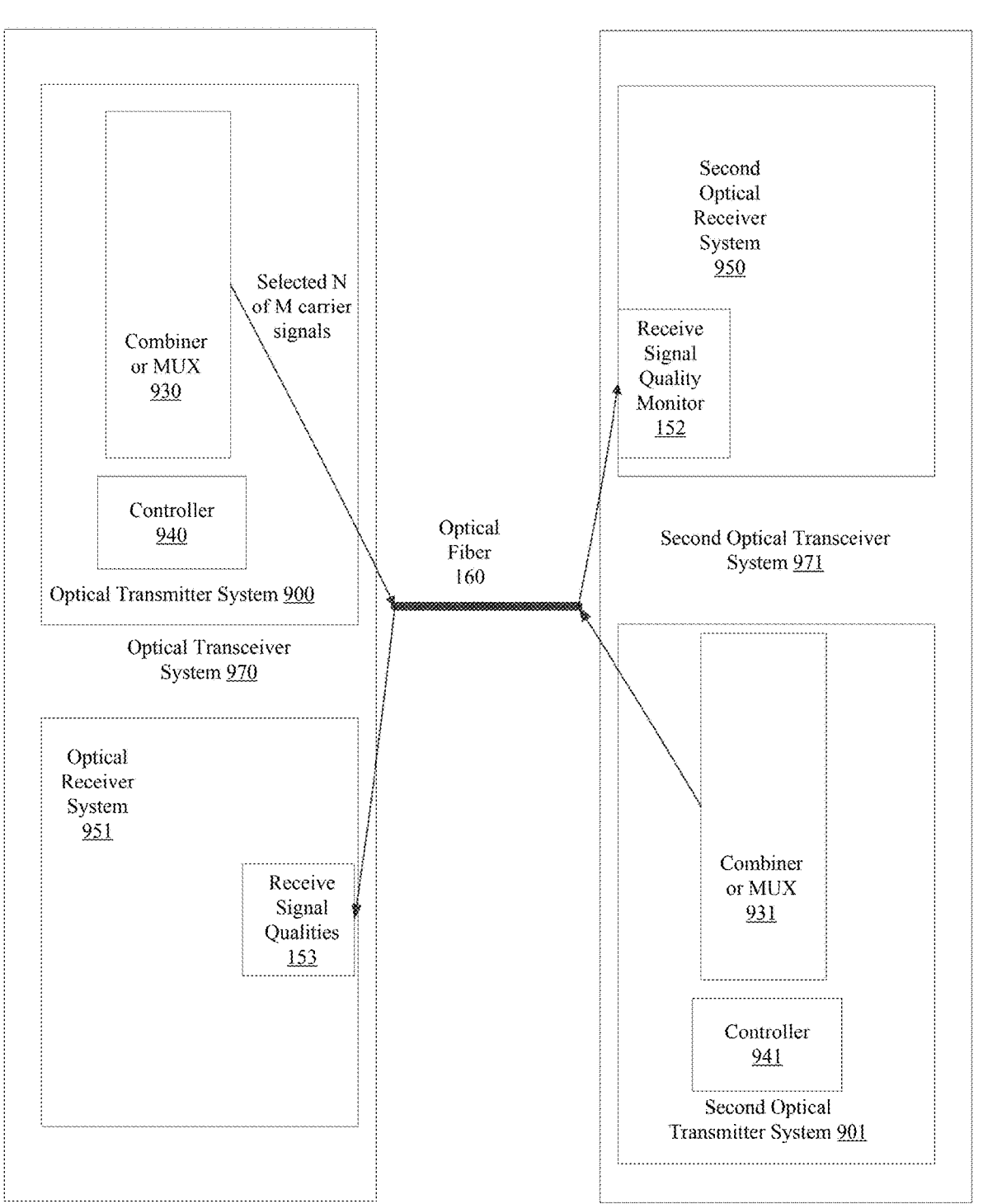
FIG. 9 shows a pair of laser transceivers, according to an embodiment.

FIG. 9 shows a pair of laser transceivers, according to an embodiment. As shown, a first laser transceiver system 970 includes an optical transmitter system 900 and an optical receiver system 951. A second laser transceiver system 971 includes a second optical transmitter system 901 and a second optical receiver system 950. For an embodiment, both of the optical transmitter systems 900, 901 include the described embodiments for selecting N of M laser. As described, the optical transmitter system 900 includes a controller 940 and a combiner or MUX 930. Further, the second optical receiver system 950 includes receive signal quality monitor 952. Similarly, the second optical transmitter system 901 includes a controller 941 and a combiner or MUX 931. Further, the optical receiver system 951 includes receive signal quality monitor 153. The optical signals of the optical lasers of the optical transmitter system 900 and the second optical transmitter system 901 propagate across the optical fiber 160 to the second optical receiver system 950 and the optical receiver system 951.

Figure 10:
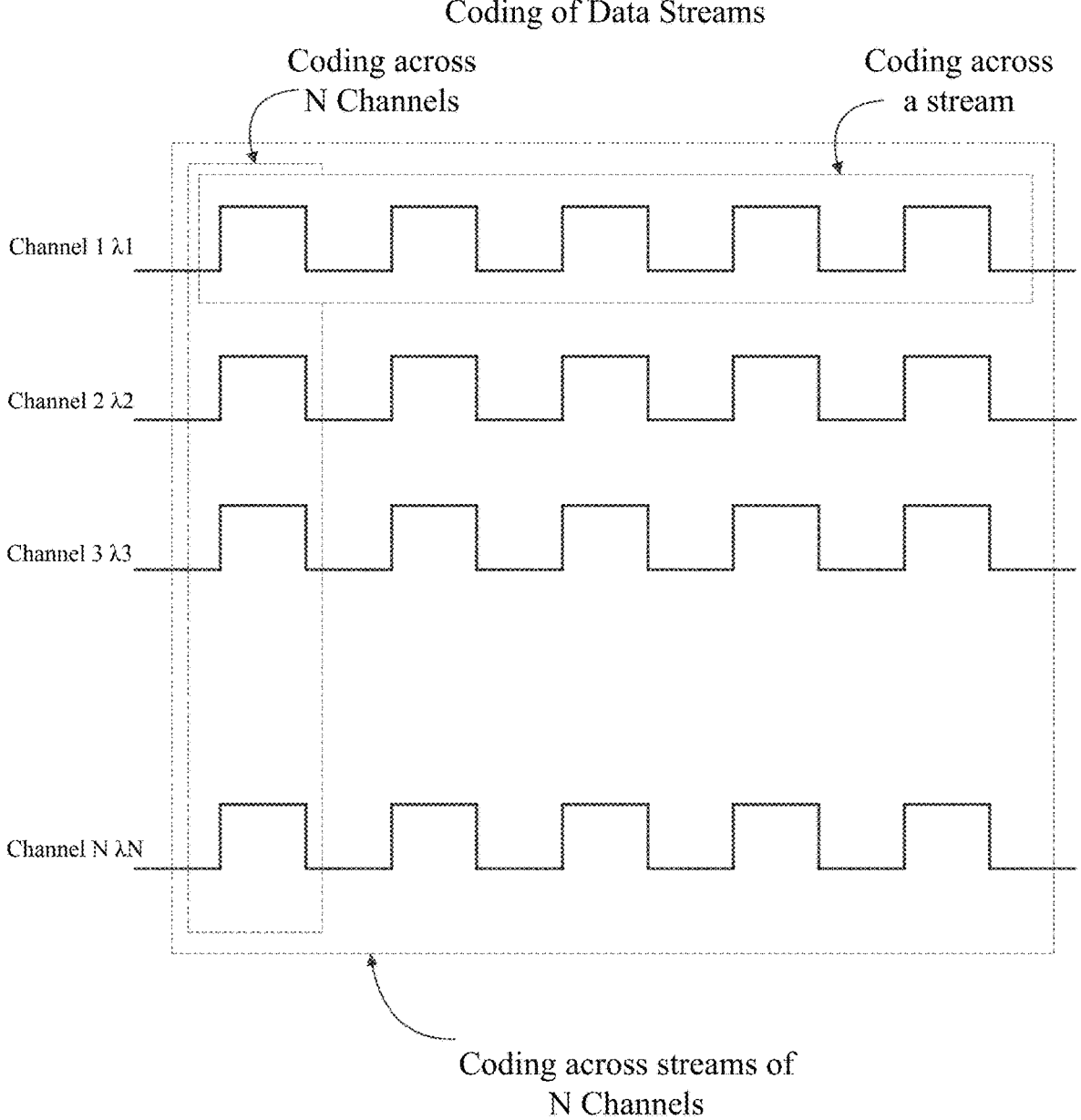
FIG. 10 shows examples of coding of laser transmission bit streams, according to embodiments.

FIG. 10 shows examples of coding of laser transmission bit streams, according to embodiments. As previously described, bit streams of the laser system may be coded. For an embodiment, a bit stream of a laser may be coded to extend the life of a laser when the quality of the laser begins to degrade over time.

As shown in FIG. 10, for an embodiment, the coding is across a data stream. For another embodiment, the coding is across multiple channels. For an embodiment, the multiple channels include N channels corresponding to the N selected lasers. For an embodiment, the multiple channels include the M channels corresponding to the M lasers. For an embodiment, the coding is across multiple channels and across a data stream of each of the multiple channels. Again, for an embodiment, the multiple channels include N channels corresponding to the N selected lasers. Again, for an embodiment, the multiple channels include the M channels corresponding to the M lasers.

Figure 11:
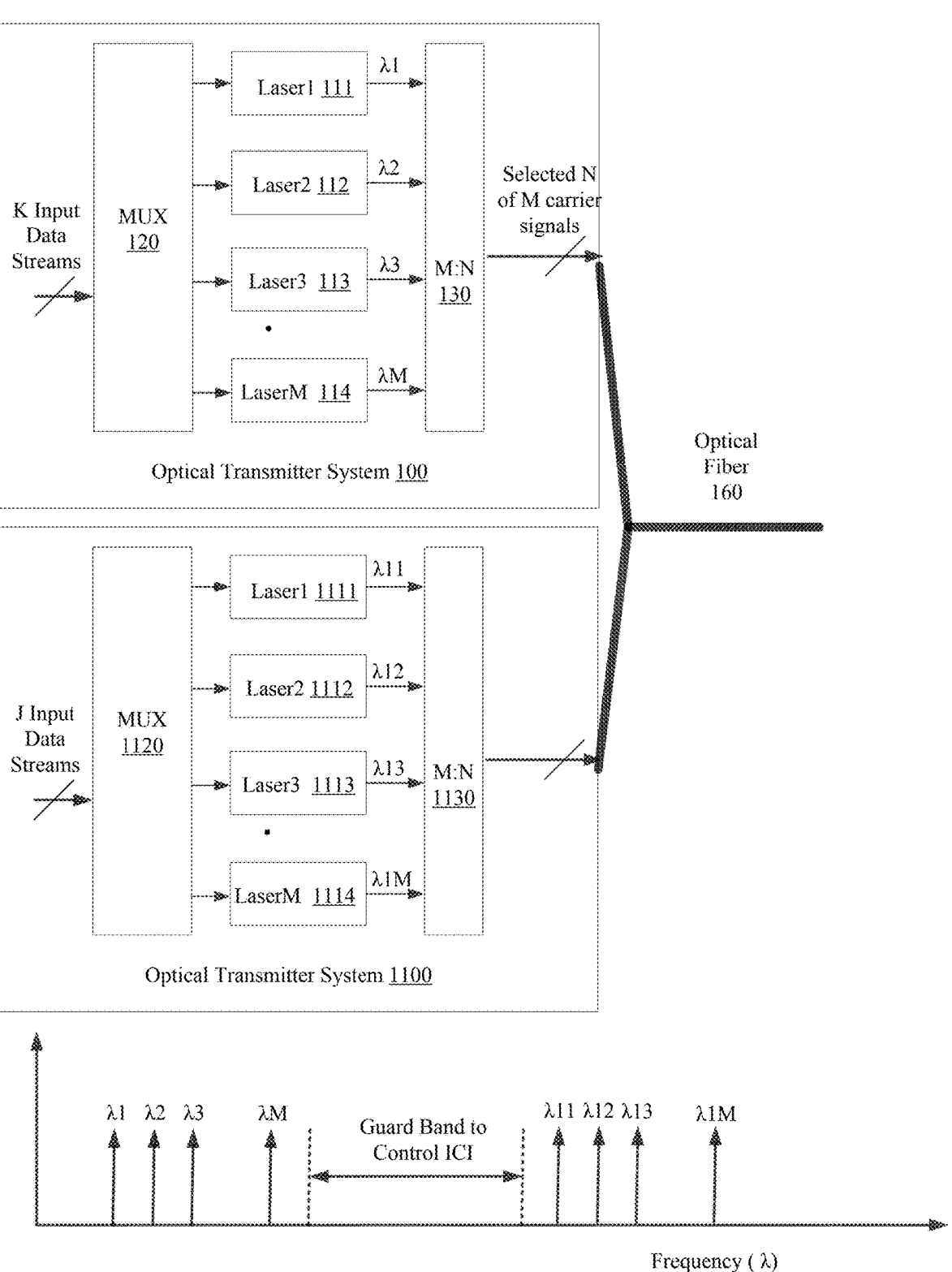
FIG. 11 shows multiple optical communication systems that include a frequency guard band between transmission frequencies (wavelengths) of the different optical transceiver systems, according to an embodiment.

FIG. 11 shows multiple optical transmitter systems 100, 1100 that include a frequency guard band between transmission frequencies (wavelengths) of the different optical transmitter systems 100, 1100, according to an embodiment. As shown, the two optical transmitter systems 100, 1100 provide optical signals that are coupled to the optical fiber 160. The optical transmitter system 100 provides carrier signals at carrier frequencies (wavelengths) between $\lambda1$-$\lambda M$, and the optical transmitter system 1100 provides carrier signals at carrier frequencies (wavelengths) between $\lambda11$-$\lambda1M$. For an embodiment, the range of wavelengths between $\lambda1$-$\lambda M$ do not overlap the range of wavelengths between $\lambda11$-$\lambda1M$. For an embodiment, a guard band is included between the range of wavelengths between $\lambda1$-$\lambda M$ and the range of wavelengths between $\lambda11$-$\lambda1M$. For an embodiment, a size of the guard band is selected to keep ICI between the two ranges below a threshold. For an embodiment, a size of the guard band is 0, making $\lambda11$-$\lambda1M$ and $\lambda11$-$\lambda1M$ equally spaced in frequency domain.

For an embodiment, similar to the optical transmitter system 100, the optical transmitter system 1100 includes an inverse MUX 1120 that receives J input data streams and generates N laser data streams. M lasers 1111, 1112, 1113, 1114 each generate an optical carriers frequency within a corresponding one of M different channels. A controller (not shown) within the optical transmitter system 1100 selects N of the M lasers. A switch selector 1130 couples the selected N carrier signals to the optical fiber 160.

Although specific embodiments have been described and illustrated, the embodiments are not to be limited to the specific forms or arrangements of parts so described and illustrated. The described embodiments are to only be limited by the claims.

What is claimed:

1. An optical transmitter system, comprising:
M different selectable lasers, each of the M different lasers configured to generate an optical communication signal having a carrier optical frequency within a corresponding channel that is different than a carrier optical frequency and corresponding channel of each of other M−1 different lasers of the M lasers;
a controller configured to select and map N of the M selectable lasers based on feedback regarding a quality of one or more of the M different lasers, wherein N<M;
a switch selector configured to select the N of the M selectable lasers for transmission over an optical fiber to a second optical receiver system; and
a multiplexer configured to receive K input data streams and generate N laser data streams, wherein each of the N laser data streams modulates a carrier signal of the selected N lasers;
wherein a mapping of the K input data streams to the N laser data streams is modulated on each of the carrier signals of the selected N lasers; and
wherein MAC packets included as information within the modulated carrier signals of the N selected lasers include the mapping of the selection of the N of the M selectable lasers, thereby conveying the mapping to an optical receiver of the modulated carrier signals.

2. The system of claim 1, wherein the switch selector selectively activates the N of the M lasers, wherein the unselected lasers are not activated.

3. The system of claim 1, wherein the mapping of the N of the M selectable lasers is modulated on M lasers.

4. The system of claim 1, wherein the K input data streams are mapped to the selected N lasers after the N of the M selectable laser are mapped.

5. The system of claim 1, wherein M is selected based on at least a projected end of life of the M different selectable lasers.

6. The system of claim 1, wherein the N selected lasers are selected based on a signal quality of each of the transmission signals of each of the M lasers.

7. The system of claim 1, wherein the N selected lasers are selected from the M lasers based on an estimated BER (bit error rate) of N modulated carrier signals.

8. The system of claim 1, wherein the N selected lasers are selected to maintain a selected frequency spacing between each of the N carrier signals.

9. The system of claim 1, wherein the controller is further configured to receive feedback from a receiver of the N modulated lasers, and adaptively update the mapping of the N of the M selectable lasers based on the received feedback.

10. The system of claim 1, wherein the controller is further configured to track a history of the mapping over time, and adaptively influence the selection of the N selected laser based on the history of the mapping.

11. The system of claim 1, wherein the controller is further configured to code selected and non-selected lasers with a same code, and track a signal quality of both the selected and non-selected lasers.

12. The system of claim 1, wherein the controller is further configured to receive feedback from a receiver of the N modulated lasers, and adaptively adjust a coding of data streams of the modulated carriers.

13. The system of claim 12, wherein the coding is across multiple carrier signals.

14. The system of claim 13, wherein the coding is across carrier signals of the M selectable lasers.

15. The system of claim 1, wherein the feedback includes a received signal quality which is tracked over time, and wherein coding is increased for select of the N modulated carrier signals as the received signal quality of one or more of the N modulated carrier signals degrades over time.

16. The system of claim 1, wherein the feedback includes a received signal quality which is tracked over time, and wherein a bias current is increased for select of the N modulated carrier signals as the received signal quality of one or more of the N modulated carrier signals degrades over time.

17. The system of claim 1, further comprising a set of M passband filters configured to out-of-band filter carrier signals of each of the M selectable filters.

18. The system of claim 1, further comprising:
a second optical transmitter system associated with the second optical receiver system configured to generate a second set of carrier signals for transmission over the optical fiber to an optical receiver system associated with the optical transmitter system;

wherein the carrier frequencies (wavelengths) of the second set a carrier signals are selected to result in a frequency guard band between the second set of carrier signals and the carrier frequencies (wavelengths) of the M different lasers;

wherein the guard band is selected to reduce ICI between the optical transmitter system and the second optical transmitter system.

19. A method, comprising:

generating, by each of a plurality of M different selectable lasers, an optical communication signal having a carrier optical frequency within a corresponding channel that is different than a carrier optical frequency and corresponding channel of each of other M−1 different lasers of the M lasers;

selecting and mapping, by a controller, N of the M selectable lasers based on feedback regarding a quality of one or more of the M different lasers, wherein N<M;

selecting, by a switch selector, the N of the M selectable lasers for transmission over an optical fiber to a second optical receiver system;

receiving, by a multiplexer, K input data streams, and generating, by the multiplexer, N laser data streams, wherein each of the N laser data streams modulates a carrier signal of the selected N lasers; and modulating a mapping of the K input data streams to the N laser data streams on each of the carrier signals of the selected N lasers;

wherein MAC packets included as information within the modulated carrier signals of the N selected lasers include the mapping of the selection of the N of the M selectable lasers, thereby conveying the mapping to an optical receiver of the modulated carrier signals.

* * * * *